US007515653B2

(12) United States Patent
Lee (10) Patent No.: US 7,515,653 B2
(45) Date of Patent: Apr. 7, 2009

(54) DIGITAL BROADCASTING RECEIVER, DRIVING METHOD THEREOF, AND SELF-DIAGNOSIS METHOD THEREOF

(75) Inventor: Tae Won Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 598 days.

(21) Appl. No.: 10/940,799

(22) Filed: Sep. 15, 2004

(65) Prior Publication Data
US 2005/0058192 A1    Mar. 17, 2005

(30) Foreign Application Priority Data
Sep. 16, 2003   (KR) .................. 10-2003-0064031

(51) Int. Cl.
*H03K 9/00*    (2006.01)
(52) U.S. Cl. ................. 375/316; 375/136; 375/137; 375/142; 375/143; 375/144; 375/147; 375/148; 375/149; 375/150; 375/152; 375/264; 375/294; 375/317; 375/326; 375/327; 375/339; 375/344; 375/345; 375/346; 375/373
(58) Field of Classification Search ......... 375/136–137, 375/142–144, 147–150, 152, 264, 294, 317, 375/326–327, 339, 344–346, 373, 394
See application file for complete search history.

(56) References Cited

U.S. PATENT DOCUMENTS

| 6,304,621 | B1* | 10/2001 | Samueli et al. ............ 375/350 |
| 6,690,746 | B1* | 2/2004 | Sills et al. ................ 375/316 |
| 6,920,189 | B1* | 7/2005 | Spalink ................... 375/326 |
| 6,980,609 | B1* | 12/2005 | Ahn ........................ 375/343 |
| 7,050,419 | B2* | 5/2006 | Azenkot et al. ............ 370/347 |
| 2004/0101068 | A1* | 5/2004 | Wang et al. ............... 375/324 |

FOREIGN PATENT DOCUMENTS

| KR | 2001-0068618 A | 7/2001 |
| KR | 2002-0014545 A | 2/2002 |

* cited by examiner

*Primary Examiner*—Shuwang Liu
*Assistant Examiner*—Kabir A Timory
(74) *Attorney, Agent, or Firm*—Birch, Stewart, Kolasch & Birch, LLP (57) ABSTRACT

A digital broadcasting receiver, a driving method, and a self-diagnosis method thereof, are provided. The digital broadcasting receiver includes: a digital demodulator for demodulating a digital broadcasting signal; a lock detector for detecting lock signals from the digital demodulator; and a lock processor for controlling the digital demodulator according to the detected lock signal.

11 Claims, 7 Drawing Sheets

DIGITAL BROADCASTING RECEIVER, DRIVING METHOD THEREOF, AND SELF-DIAGNOSIS METHOD THEREOF

This application claims the benefit of the Korean Application No. P2003-0064031 filed on Sep. 16, 2003, which is hereby incorporated by reference as if fully set forth herein.

BACKGROUND OF THE INVENTION

1. Field of the Invention

The present invention relates to a digital broadcasting receiver, and more particularly, to a digital broadcasting receiver, a driving method and a self-diagnosis method thereof that can diagnose and settle its problems by itself.

2. Discussion of the Related Art

In general, a digital broadcasting receiver can be roughly divided into three receiving methods.

First, there is a ground wave broadcasting receiving method, which includes a VSB (Vestigial Side Band) method and an OFDM (Orthogonal Frequency Division Multiplexing) method. Second, a cable broadcasting receiving method, which includes QAM (Quadrature Amplitude Modulation) method. Third, a satellite broadcasting receiving method, which includes QPSK (Quadrature Phase Shift Keying) method These three receiving methods are different each other in their analog reception block, signal synchronization method, channel equalizing method, matched filter, and channel demodulation method.

However, recently, a multi-medium digital broadcasting receiver capable of incorporating the above-mentioned receiving methods is under development.

Figure 1:
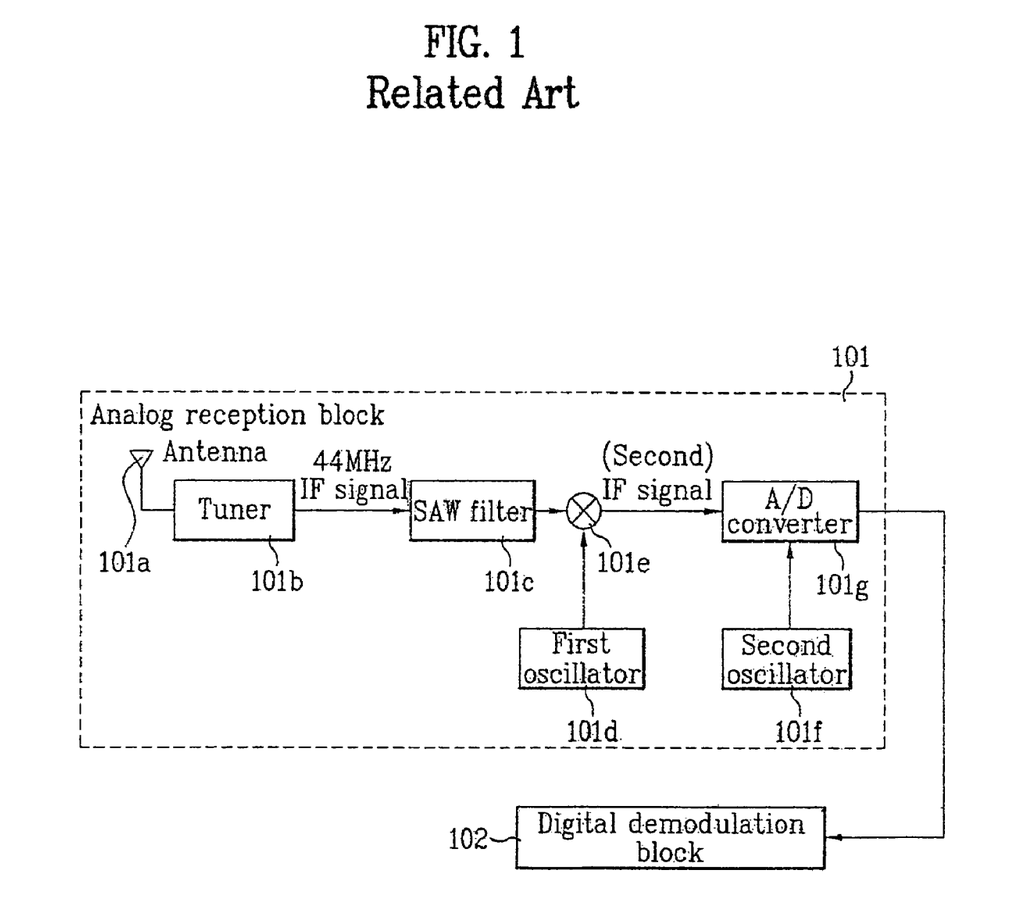
FIG. 1 is a block diagram of a construction of the multimedia digital broadcasting receiver.

FIG. 1 is a block diagram illustrating a construction of a general multi-medium digital broadcasting receiver. As shown in FIG. 1, the general multi-medium digital broadcasting receiver includes: an analog reception block 101 for receiving a radio frequency (RF) signal and converting the signal into an intermediate frequency (IF) signal; a digital demodulation block 102 for demodulating a converted digital signal using an A/D (Analog/Digital) converter 101g.

The analog reception block 101 receives a radio frequency signal of 50-860 MHz, converts the signal into an IF signal, converts the converted signal into a digital signal using an A/D converter 101g, and delivers the digital signal to the digital demodulation block 102.

The analog reception block 101 includes: a tuner 101b for converting a RF signal of 50-860 MHz received through an antenna 101a into a first IF signal of about 44 MHz; a surface acoustic wave (SAW) filter 101c for filtering a signal outputted from the tuner 101b; a first oscillator 101d for generating an oscillating frequency so as to generate a second IF signal; a mixer 101e for converting the filtered signal into a second IF signal by down-converting the signal filtered by the SAW filter 101c using an oscillating frequency generated at the first oscillator 101d; a second oscillator 101f for generating a sampling frequency; and the A/D converter 101g for converting a signal converted by the mixer 101e into a digital signal according to a sampling frequency generated at the second oscillator 101f.

At this point, the analog reception block 101 among elements of the multi-medium digital broadcasting receiver has a standardized construction as shown in FIG. 1 regardless of demodulation methods.

On the contrary, the digital demodulation block 102 may have a variety of forms depending on demodulation methods such as VSB, OFDM, QAM, QPSK.

Generally, the digital demodulation block 102 may include a gain recovery, a phase splitter, a complex multiplier, an interpolator, a match filter, a symbol clock recovery, a channel equalizer, a carrier recovery, and an FEC (Forward Error Correction).

However, since the multi-medium digital broadcasting receiver is operated in response to an individual lock of each element, there is a problem in that stability of a system is deteriorated if a false lock is generated between the elements.

For example, if a gain recovery operates after a system is reset, other elements should be a reset mode.

However, with a gain of a received signal not tracked up to an appropriate level, if a channel equalizer of a blind state is operated, there is high possibility that the channel equalizer operates in its state of local minima. Such characteristics are fatal to system stability.

Further, since a training sequence does not exist in the QAM method, there is high possibility that a symbol clock recovery and a carrier recovery diverge.

Further, the symbol clock recovery operates in response to an automatic gain control (AGC) lock signal from a lock detector of the gain recovery.

However, the elements at the end should maintain a reset state constantly, but if the channel equalizer operates, there is high possibility that the channel equalizer operates in the state of local minima, which is fatal to system stability.

SUMMARY OF THE INVENTION

Accordingly, the present invention is directed to a digital broadcasting receiver, a driving method and a self-diagnosis method thereof that substantially obviate one or more problems due to limitations and disadvantages of the related art.

An object of the present invention is to provide a digital broadcasting receiver, a driving method, and a self-diagnosis method thereof that can perform a stable operation between elements of a system and improve acquisition speed and a tracking performance.

Another object of the present invention is to provide a digital broadcasting receiver, a driving method, and a self-diagnosis method thereof, which can be effectively utilized in developing a product, by analyzing tracking performance of a receiver using lock information of elements of a system.

Another object of the present invention is to provide a digital broadcasting receiver, a driving method, and a self-diagnosis method thereof that can swiftly solve problems generated at elements of a system using lock information of the elements of the system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital broadcasting receiver includes: a digital demodulator for demodulating a digital broadcasting signal; a lock detector for detecting lock signals of the digital demodulator; and a lock processor for controlling the digital demodulator according to the detected lock signal.

Here, the lock detector may include: an AGC lock detector for outputting an AGC LOCK signal to the lock processor if the digital demodulator performs a gain control step; a symbol clock lock detector for outputting a TR LOCK signal to the lock processor if the digital demodulator performs a timing recovery step; a carrier signal lock detector for outputting a CR LOCK signal to the lock processor if the digital demodulator performs a carrier signal recovery step; a FEC (forward error correction) lock detector for outputting a FEC LOCK signal to the lock processor if the digital demodulator performs an error correction step; an input signal detector for outputting a NO SIGNAL signal to the lock processor by judging whether an input signal is present, provided with level information of the input signal from a gain recovery of the digital demodulator; a SNR (signal-to-noise ratio) calculator for outputting a SNR LOCK signal to the lock processor according to a SNR of a signal received through a carrier recovery of the digital demodulator.

The lock processor may include a lock information storage block for storing a time point at which the lock signal is detected.

Here, the lock information storage block may include: a timer for counting a time according to a control signal; a memory having a storage space assigned for each lock signal; a storage controller for storing a final lock time of each lock signal in the memory by receiving lock signals received from the lock processor and time information of the timer.

In another aspect of the present invention, a digital broadcasting receiver includes: a digital demodulator for having a gain recovery, a symbol clock recovery, a channel equalizer, a carrier recovery, a FEC (Forward Error Correction) and demodulating a digital broadcasting signal; an input signal detector for outputting a NO SIGNAL signal by judging whether an input signal is present, provided with level information of the input signal from the gain recovery; an AGC lock detector for outputting an AGC LOCK signal if the gain recovery performs a gain control; a symbol clock lock detector for outputting a TR LOCK signal if the symbol clock recovery performs a timing recovery; a SNR calculator for outputting a SNR LOCK signal according to an SNR of a signal received through the carrier recovery; a carrier signal lock detector for outputting a CR LOCK signal if the carrier recovery performs a carrier signal recovery; a FEC lock detector for outputting a FEC LOCK signal if the FEC performs an error correction; and a lock processor for controlling the gain recovery, the symbol clock recovery, the channel equalizer, the carrier recovery, the FEC according to the lock signals.

Here, the lock processor can control the symbol clock recovery to be operated if the lock signal is received from the input signal detector, and control a channel equalizer and a carrier recovery to be operated if the lock signal is received from the AGC lock detector or the symbol clock lock detector, and control the FEC is operated if the lock signal is received from the SNR calculator or the carrier signal lock detector.

In still another aspect of the present invention, a method for driving a digital broadcasting receiver having a gain recovery, a symbol clock recovery, a channel equalizer, a carrier recovery, a FEC (Forward Error Correction), and a lock signal detector for outputting a lock signal according to operations of the above elements, includes the steps of: receiving a reset signal; driving the gain recovery and judging whether an input signal is present according to a lock signal received from the lock signal detector; if the input signal is present, driving the symbol clock recovery and judging whether the symbol clock recovery has performed a timing recovery according to a lock signal received from the lock signal detector; if the symbol clock recovery performs the timing recovery, driving the channel equalizer and the carrier recovery and judging whether the channel equalizer and the carrier recovery have performed a carrier recovery according to a lock signal received from the lock signal detector; if the channel equalizer and the carrier recovery perform the carrier signal recovery, driving the FEC and judging whether the FEC has performed an error correction according to a lock signal received from the lock signal detector; and if the FEC performs an error correction, storing information regarding the lock signal received from the lock signal detector.

In further still another aspect of the present invention, a method for self-diagnosing a digital broadcasting receiver having a gain recovery, a symbol clock recovery, a channel equalizer, a carrier recovery, a FEC (Forward Error Correction), and a lock signal detector for outputting a lock signal according to operations of the above elements, includes the steps of: judging whether a lock signal regarding an input signal is received; if the lock signal regarding the input signal is received, judging whether a lock signal regarding an operation of the gain recovery is received; if the lock signal regarding the operation of the gain recovery is received, judging whether a lock signal regarding an operation of the symbol clock recovery is received; if the lock signal regarding the operation of the symbol clock recovery is received, judging whether lock signals regarding operations of the channel equalizer and the carrier recovery are received; if the lock signals regarding the operations of the channel equalizer and the carrier recovery are received, judging whether a lock signal regarding an operation of the FEC is received; if the lock signal regarding the operation of the FEC is received, judging whether a video output is normal; if the video output is normal, terminating a self-diagnosis.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 2:
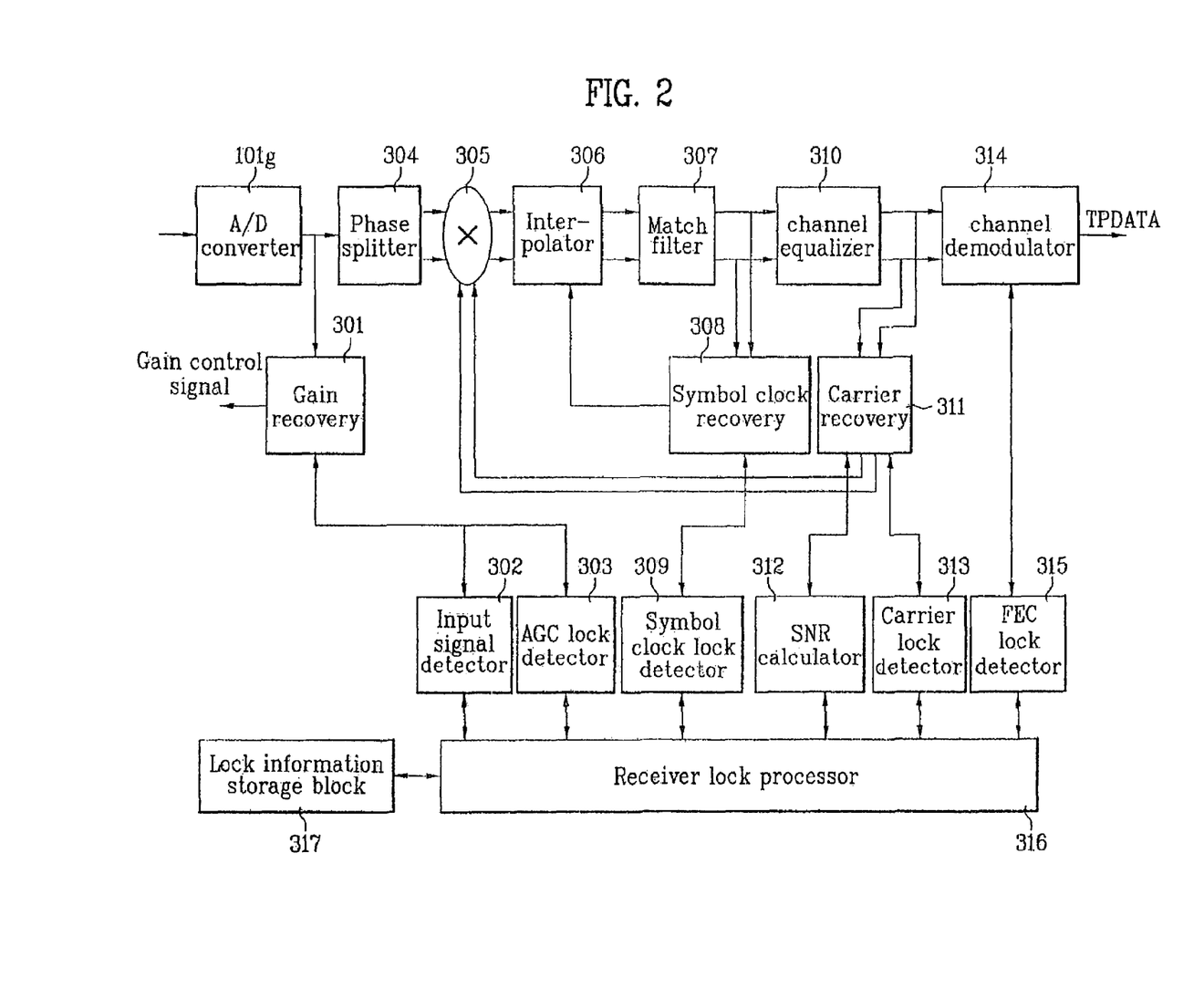
FIG. 2 is a block diagram of a construction of a digital demodulation block according to the present invention.

FIG. 2 is a view illustrating a construction of a digital demodulation block according to the present invention. The digital demodulation block includes: a gain recovery 301; an input signal detector 302; an AGC lock detector 303; a phase splitter 304; a complex multiplier 305; an interpolator 306; a match filter 307; a symbol clock recovery (TR) 308; a symbol clock lock detector 309; a channel equalizer 310; a carrier recovery (CR) 311; a SNR (Signal-to-Noise Ratio) calculator 312; a carrier signal lock detector 313; a channel demodulator 314; a FEC lock detector 315; a receiver lock processor 316; and a lock information storage block 317.

The gain recovery 301 compensates a size of a signal so that an A/D converter may normally convert an analog signal into a digital signal since an IF signal passing through a SAW filter of an analog reception block is weak.

The input signal detector 302 receives level information of an input signal from the gain recovery 301 and judges whether an input signal is present. If an input signal is not present, the input signal detector 302 outputs a NO SIGNAL signal to the receiver lock processor 316.

The AGC lock detector 303 receives an input signal from the gain recovery 301 and measures an average of a received power, and then obtains a difference between the received power average and a predetermined reference power value to judge a tracking and an acquisition of a gain, and then if a gain recovery is completed, outputs an AGC LOCK signal to the receiver lock processor 316.

The phase splitter 304 splits an output from the A/D converter into a signal at a passband real component Q and a passband imaginary component I whose phases are −90° with respect to each other, and then outputs the split signal to the complex multiplier 305.

The complex multiplier 305 multiplies a passband real component signal and a passband imaginary component signal, received from the phase splitter 304, by a reference carrier signal in which a carrier recovery has been made through the carrier recovery 311, thereby converting the passband real component and the passband imaginary component signals into a baseband real component and a baseband imaginary component signals.

The interpolator 306 interpolates the baseband real component and the baseband imaginary component signals outputted from the complex multiplier 305 into a digital signal synchronized at a two-times greater symbol clock frequency using an output frequency of the symbol clock recovery 308 and outputs the digital signal to the match filter 307.

The match filter 307 filters a signal received from the interpolator 306 so that a SNR of the signal may be maximum.

The symbol clock recovery 308 detects symbol timing information from an output from the match filter 307 and then amends a symbol clock signal attenuated by a multi-path, performs a symbol clock recovery, and delivers a signal whose symbol clock has been recovered, to the interpolator 306.

The symbol clock lock detector 309 receives timing information from the symbol clock recovery 308, measures an average of an timing error, and if a tracking and an acquisition are performed through comparison of the timing error average with a predetermined reference error value and a timing recovery is completed, the symbol clock lock detector 309 outputs a TR LOCK signal to the receiver lock processor 316.

In the digital transmission system such as a HDTV (High Definition Television), a bit detection error is generated at a reception side due to a distortion occurring when a transmission signal passes through a multi-path channel, an interference due to an NTSC (National Television System committee) signal, and a distortion by a transmission/reception system. Particularly, propagation of a signal through a multi-path generates an inter-symbol interference and becomes a primary factor generating a bit detection error. The channel equalizer 310 removes the inter-symbol interference.

The carrier recovery 311 extracts a pilot signal only, from an output of the channel equalizer 310, detects multi-path channel information using the pilot signal, and then recovers a carrier by amending a carrier attenuated by the multi-path, and delivers the recovered carrier signal to the complex multiplier 305.

The SNR calculator 312 computes a mean square error (MSE), judges a SNR condition, and outputs an SNR LOCK signal to the receiver lock processor 316.

The carrier lock detector 313 computes an MSE between a received signal and a determined signal, and if a carrier recovery is completed by performing a tracking and a acquisition of a carrier through comparison of the computed MSE value with predetermined MSE values, the carrier lock detector 313 outputs a CR LOCK signal to the receiver lock processor 316.

In a transmission system, a variety of error correction code systems is used depending on channel environments. The channel demodulator 314 uses a RS code system and a lattice modulation code system and performs an interleaving for an error dispersion.

The FEC lock detector 315 judges whether a reception error is present and outputs a FEC LOCK signal to the receiver lock processor 316.

The receiver lock processor 316 receives lock signals (NO SIGNAL, AGC LOCK, TR LOCK, CR LOCK, SNR LOCK, FEC LOCK) from detectors (input signal detector, AGC lock detector, symbol clock lock detector, SNR lock detector, carrier lock detector, FEC lock detector), sequentially operates each recovery so as to minimize mutual adverse effect between feedback loops and prevents diverge of the channel equalizer 310.

The lock information storage block 317 receives lock signals (NO SIGNAL, AGC LOCK, TR LOCK, CR LOCK, SNR LOCK, FEC LOCK) from the receiver lock processor 316 and stores timer time information regarding each lock signal.

Figure 3:
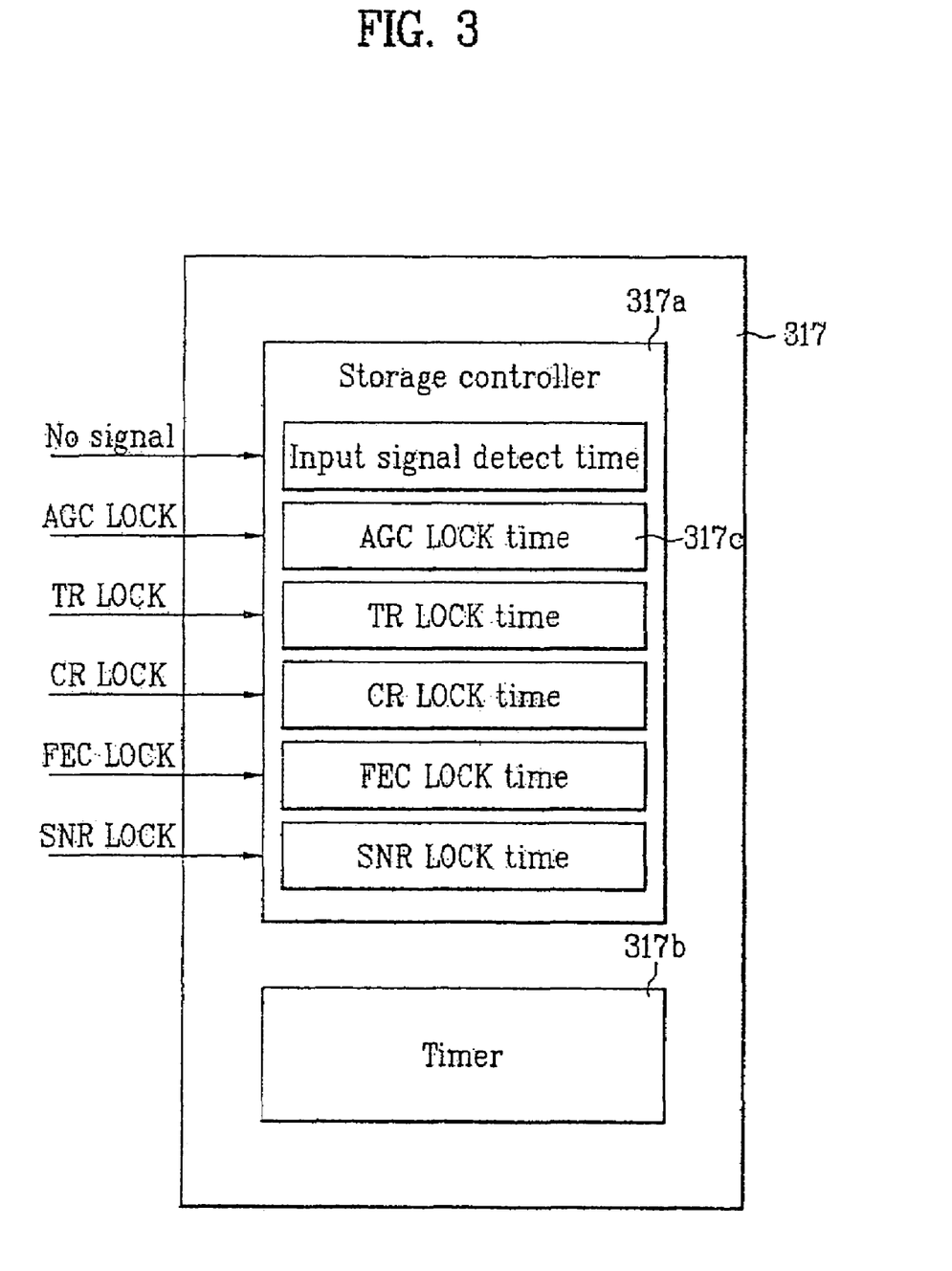
FIG. 3 illustrates a structural view of a lock information storage block.

FIG. 3 is a view illustrating a detail structure of the lock information storage block 317. The lock information storage block 317 includes: a storage controller 317a; a timer 317b; and a memory 317c.

The timer 317b counts a time starting from a time point at which a system is enabled. The storage controller 317a receives lock signals provided from the receiver lock processor 316 and time information of the timer 317b and stores a final lock time of each lock signal in the memory 317c.

The memory 317c assigns a storage space for each lock signal so that a final lock time of each lock signal may be stored.

Figure 4:
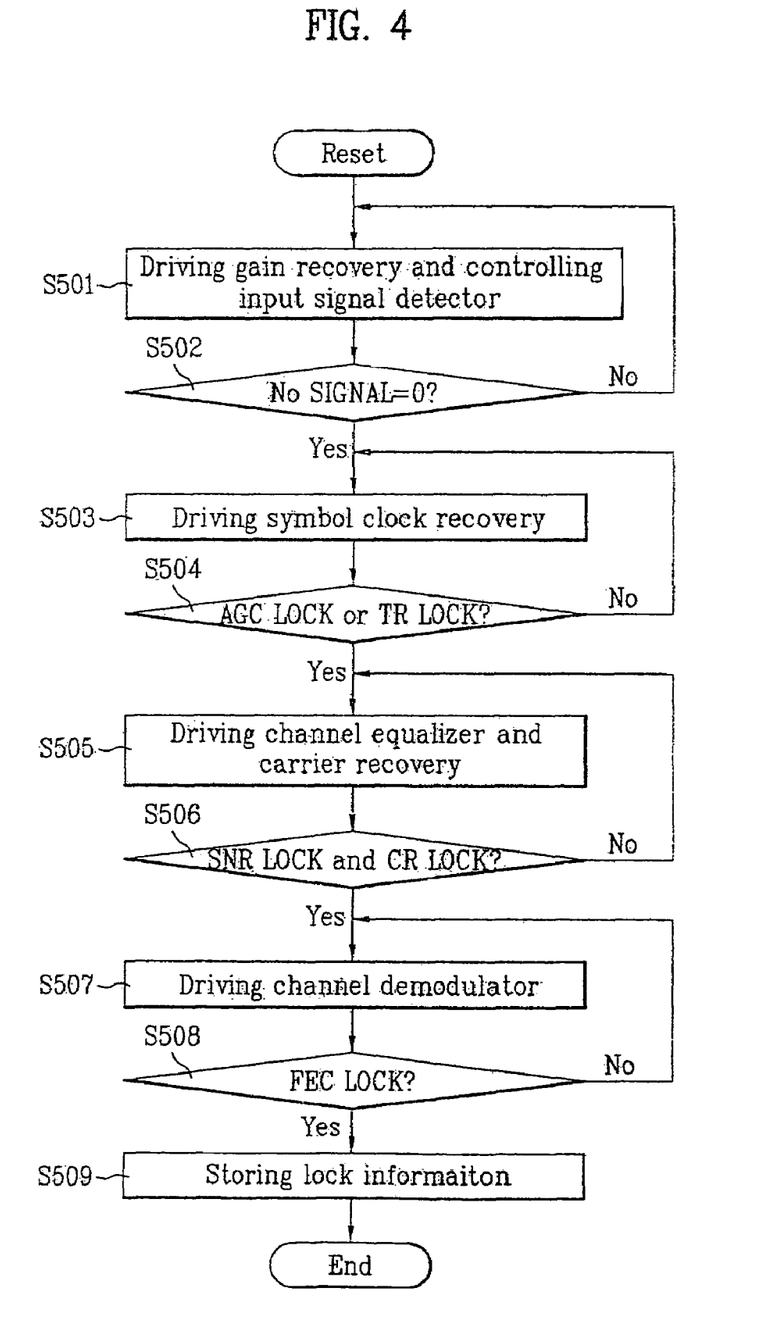
FIG. 4 is a flowchart explaining an operation of a receiver lock processor.

FIG. 4 is a flowchart explaining an operation of the receiver lock processor.

If a reset signal is received, the receiver lock processor 316 operates the gain recovery 301 to control a gain recovery to be performed and controls the input signal detector 302 to detect whether an input signal is present (S501).

If the gain recovery 301 is operated, the input signal detector 302 receives level information of a received input signal from the gain recovery 301 so as to judge whether an input signal is present, and if the input signal is judged to be present, the input signal detector 302 outputs a NO SIGNAL=0 signal to the receiver lock processor 316.

The receiver lock processor 316 determines whether a NO SIGNAL=0 signal is received from the input signal detector 302 (S502), and if the NO SIGNAL=0 signal is determined to be received, the receiver lock processor 316 operates the symbol clock recovery 308 (S503).

On the contrary, if a NO SIGNAL=1 signal is received as a result of the determination, the step 501 (S501) is performed to operate the gain recovery 301, control the input signal detector 302 to judge whether an input signal is present, and determine a NO SIGNAL=0 signal is received from the input signal detector 302.

If the symbol clock recovery 308 is operated, the symbol clock lock detector 309 measures an average of a timing error, which is an output from the symbol clock recovery 308, and performs a tracking and an acquisition through comparison of the average with a predetermined reference error value, and if a timing error recovery is completed, the symbol clock lock detector 309 outputs a TR LOCK signal to the receiver lock processor 316. The AGC lock detector 303 receives an input signal from the gain recovery 301, measures an average of received powers, obtains a difference between the average and a predetermined reference power, judges a tracking and an acquisition of a gain, and if an gain recovery is completed, the AGC lock detector 303 outputs an AGC LOCK signal to the receiver lock processor 316.

The receiver lock processor 316 determines whether the TR LOCK signal or the AGC LOCK signal is received (S504), and if either of the TR LOCK signal or the AGC LOCK signal is received, the receiver lock processor 316 operates the channel equalizer 310 and the carrier recovery 311 (S505).

Figure 6:
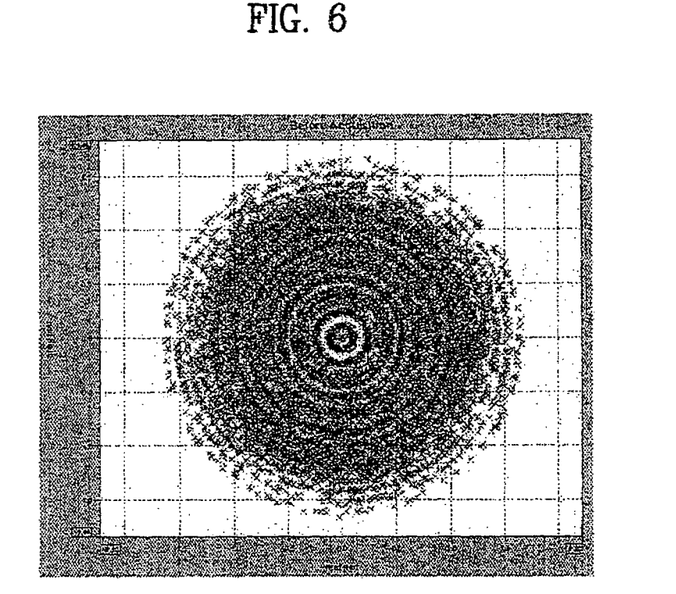
FIG. 6 is a view illustrating a status where a gain recovery and a symbol clock recovery are completed.

If the gain and the symbol clock are recovered as described above, a circular band shape is formed as shown in FIG. 6.

On the contrary, if neither of the TR LOCK signal or the AGC LOCK signal is received, the step 503 (S503) is performed.

If the channel equalizer 310 and the carrier recovery 311 are operated, the SNR calculator 312 calculates a MSE, judges a SNR condition, and outputs a SNR LOCK signal to the receiver lock processor 316. The carrier lock detector 313 calculates a MSE of a received signal and a determination signal, performs a tracking and an acquisition of a carrier through comparison of the MSE with a predetermined MSE, and if a carrier recovery is completed, the carrier lock detector 313 outputs a CR LOCK signal to the receiver lock processor 316.

Subsequently, the receiver lock processor 316 determines whether a SNR LOCK signal and a CR LOCK signal are received (S506). If the SNR LOCK signal and the CR LOCK signal are received as a result of the determination, the receiver lock processor 316 operates the channel demodulation block 314 (S507). On the contrary, if neither of the SNR LOCK signal or the CR LOCK signal is received as a result of the determination, the step 505 (S505) is performed.

Figure 7:
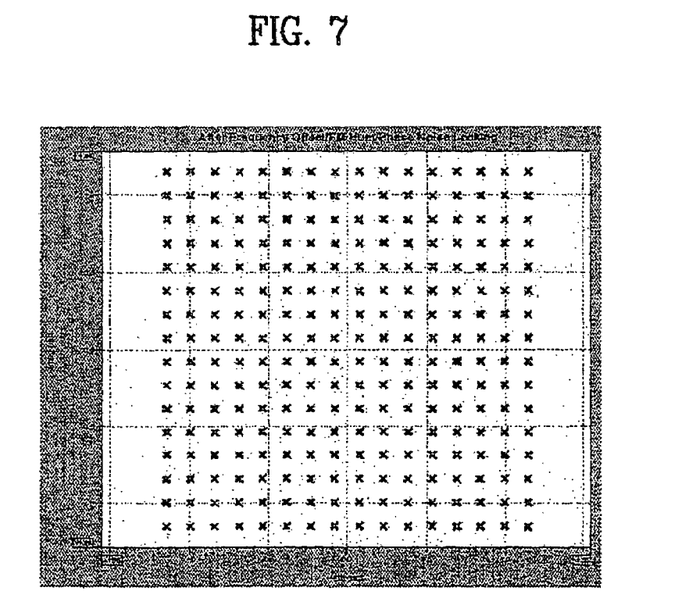
FIG. 7 is a view illustrating a status where a carrier recovery and a channel equalizing are completed.

At this point, if the carrier recovery and the channel equalizing are completed, a symbol made by a transmitter is recovered as shown in FIG. 7.

If the channel demodulation block 314 is operated, the FEC lock detector 315 judges whether a reception error is present, and if a reception error is not present, the FEC lock detector 315 outputs a FEC LOCK signal to the receiver lock processor 316.

The receiver lock processor 316 determines whether a FEC LOCK signal is received (S508) and if a FEC signal is received as a result of the determination, the receiver lock processor 316 stores received lock information (NO SIGNAL, AGC LOCK, TR LOCK, SNR LOCK, CR LOCK, FEC LOCK) in the lock information storage block 317 (S509). On the contrary, if a FEC LOCK signal is not received as a result of the determination, the step 508 (S508) is performed.

Figure 5:
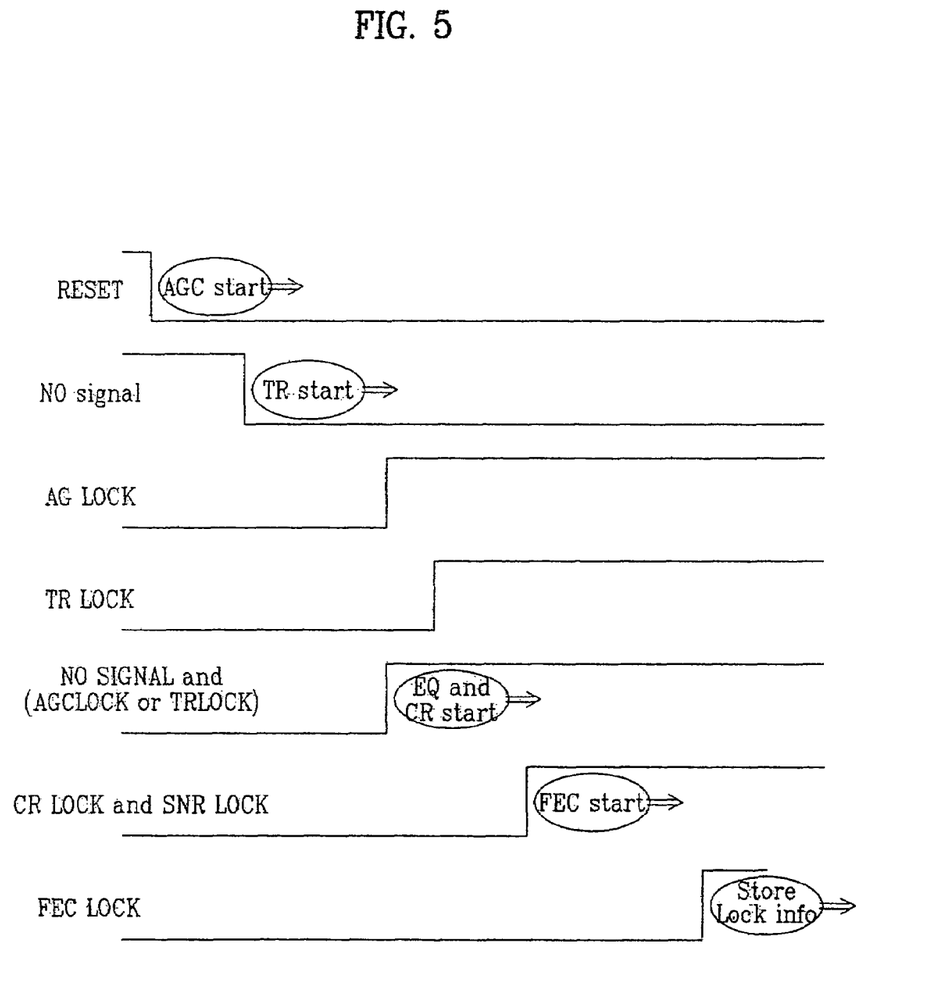
FIG. 5 is a timing diagram illustrating a transition process of a receiver lock processor.

FIG. 5 is a timing diagram illustrating a transition process of the receiver lock processor, in which: if a reset signal is enabled as '0', the receiver lock processor 316 operates the gain recovery 301, and then if an input signal is detected and a NO SIGNAL=0 signal is received from the input signal detector 302, the receiver block processor 316 operates the symbol clock recovery 308.

If a gain is recovered by the gain recovery 301 and an AGC LOCK signal is received from the AGC lock detector 303, or a symbol clock is recovered by the symbol clock recovery 308 and a TR LOCK signal is received from the symbol clock lock detector 309, the channel equalizer 310 and the carrier recovery 311 are operated.

After that, if a signal received from the carrier recovery 311 satisfies a SNR condition and a SNR LOCK signal is received from the SNR calculator 312, and a carrier recovery is completed and a CR LOCK signal is received from the carrier lock detector 313, the channel demodulation block 314 is operated.

The FEC lock detector 315 judges whether a reception error is present and if a reception error is not present, the FEC lock detector 315 outputs a FEC LOCK signal to the receiver lock processor 316. If a FEC LOCK signal is received, the receiver lock processor 316 stores all the received lock information (NO SIGNAL, AGC LOCK, TR LOCK, SNR LOCK, CR LOCK, FEC LOCK) in the lock information storage block 317.

Figure 8:
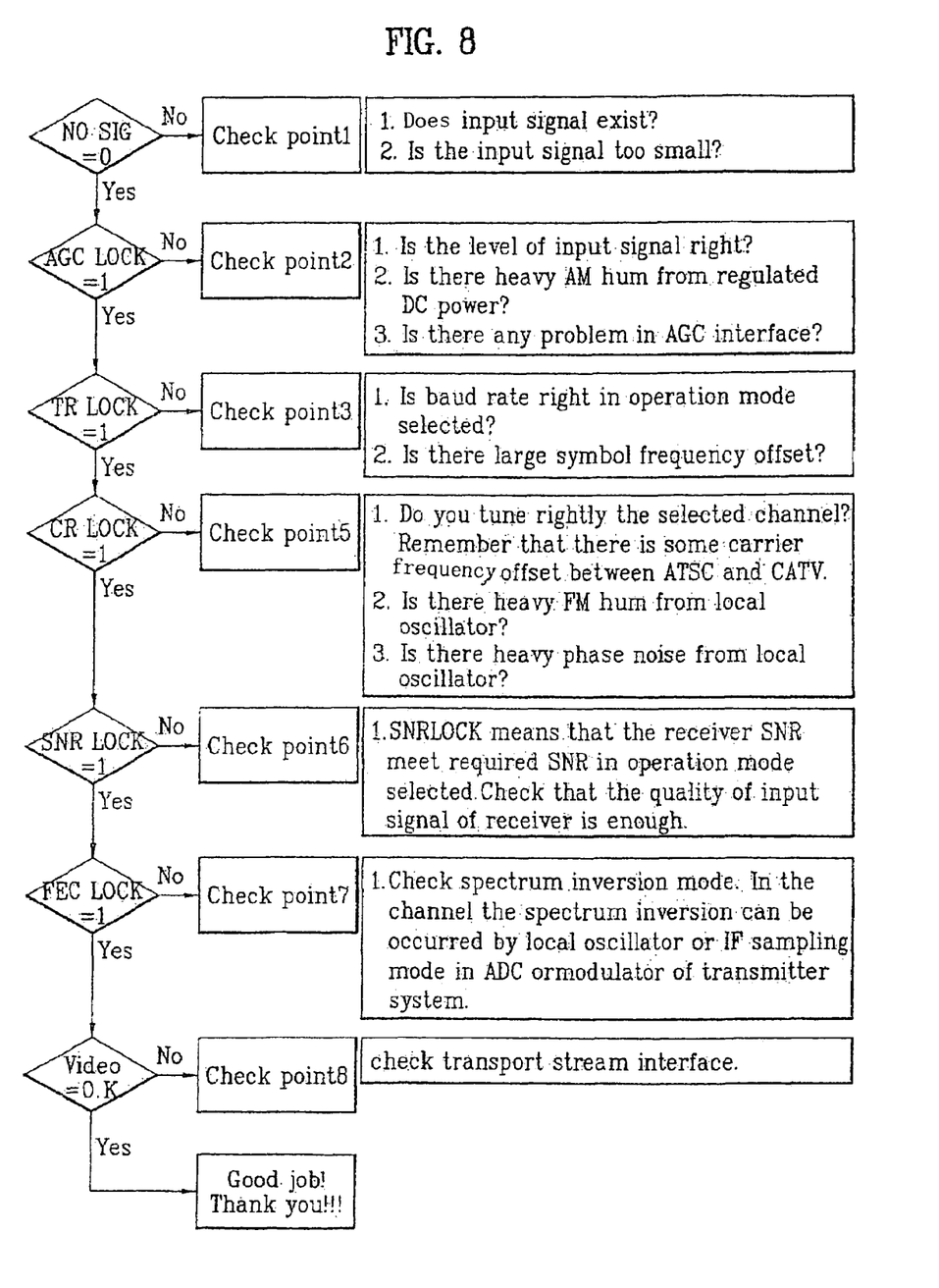
FIG. 8 is a view illustrating a self-diagnosis method of a digital TV receiver according to the present invention.

FIG. 8 is a view illustrating a self-diagnosis method of a digital TV receiver according to the present invention and includes a step for sequentially judging, at the receiver lock processor 316, whether a LOCK signal is received. More specifically, FIG. 8 shows a method for diagnosing a problem generated at the receiver in case a relevant lock signal that should be received at each step is not received.

Signals should be received to the receiver lock processor 316 in the order of NO SIGNAL=0→AGC LOCK=1→TR LOCK=1→CR LOCK=1→SNR LOCK=1→FEC LOCK=1. If a specific lock signal is not received at a relevant order, the digital TV receiver inspects whether the receiver itself satisfies a condition under which a relevant lock signal is generated, thereby performing diagnosis for its status.

The NO SIGNAL=0 is a signal generated if and only if there exists an input signal and an intensity of the signal is more than a predetermined reference value. Therefore, the receiver lock processor 316 inspects if an input signal is present or if an input signal is too weak in case a NO SIGNAL=0 signal is not received.

If an AGC LOCK=1 signal is not received after a NO SIGNAL=0 signal is received, the receiver lock processor determines whether an input signal level is correct, whether a heavy AM (amplitude modulation) hum is received from a periodic DC (direct current) power, and whether there is a problem in an AGC interface.

If a TR LOCK=1 signal is not received after an AGC LOCK=1 signal is received, the receiver lock processor determines whether a baud rate is appropriate for a selected operation mode and whether there exists a big symbol frequency offset.

Subsequently, if a CR LOCK=1 signal is not received after a TR LOCK=1 signal is received, the receiver lock processor determines whether a tuning has been performed in appropriate for a selected channel (considering that there is some carrier frequency offset between ATSC (Advanced Television System Committee) and CATV (Cable Television)), whether a heavy FM (frequency modulation) hum is received from a local oscillator, and whether a phase noise is received from a local oscillator.

The SNR LOCK means that received SNR satisfies a SNR required by a system. If a SNR LOCK=1 signal is not received after a CR LOCK=1 signal is received, the receiver lock processor determines whether a quality of an input signal from the receiver is sufficiently good.

In a CATV channel, a spectrum conversion may be generated due to an IF sampling mode in a local oscillator or ADC, or a modulator of a transmission system. Therefore, if a FEC LOCK=1 signal is not received, the receiver lock processor determines a spectrum conversion mode.

If a FEC LOCK=1 is received, the receiver lock processor 316 determines whether a video output is normal.

If a video output is not normal, transmission stream interface is inspected and if a video output is normal, it is determined that there is no problem at a reception system.

That is, the receiver can swiftly diagnose where a problem of the receiver is originated from, using whether a lock signal is received or not.

The above-described digital broadcasting receiver, the driving method, and the self-diagnosis method have the following effect.

First, since the present invention receives lock signals from lock detectors to sequentially operate each recovery, mutual adverse effect between feedback loops can be minimized and diverge of the channel equalizer can be prevented. Therefore, the present invention can perform a stable operation and improve a tracking speed and an acquisition performance thanks to exact locking between system blocks.

Second, since the present invention can analyze a tracking performance of the receiver using lock timing information, the present invention can be effectively utilized in developing a product.

Third, since the present invention can diagnose a status of the receiver according to whether a lock signal is received, a problem generated at the receiver can be solved in a more swift and exact manner.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A digital broadcasting receiver, comprising:
   a digital demodulator configured to demodulate a digital broadcasting signal;
   a lock detector configured to detect a plurality of lock signals output from the digital demodulator along with demodulating operational steps of the digital demodulator; and
   a lock processor configured to control the demodulating operational steps of the digital demodulator according to the detected lock signals,
   wherein the plurality of lock signals include at least a NO SIGNAL signal indicating an input signal is present, an AGC LOCK signal indicating a gain control step has been completed, a TR LOCK signal indicating a timing error recovery step has been completed, a CR LOCK signal indicating a carrier signal recovery step has been completed, an SNR (signal-to-noise ratio) lock signal indicating that a measured SNR meets a predetermined SNR, and an FEC (forward error correction) LOCK signal indicating an error correction step has been completed,
   wherein the lock processor is further configured to examine each of the plurality of lock signals and output information to correct a problem causing a corresponding lock signal not be detected by the lock detector, and
   wherein the lock processor comprises:
   a timer configured to count a time starting from a time point at which the receiver is enabled;
   a memory having respective storage spaces assigned for the plurality of lock signals; and
   a storage controller configured to receive the lock signals from the lock detector and to control the demodulating operational steps of the digital demodulator using a final lock time of the received lock signals and time information corresponding to the time counted by the timer.

2. The digital broadcasting receiver of claim 1, wherein the digital demodulator comprises:
   a gain recovery configured to compensate a size of a digital signal outputted from an analog processor;
   a phase splitter configured to split a digital signal outputted from the analog processor, into a passband real signal and a passband imaginary signal;
   a complex multiplier configured to convert the passband real signal and the passband imaginary signal into a baseband real signal and a baseband imaginary signal by multiplying the passband real signal and the passband imaginary signal outputted from the phase splitter by a carrier signal where a carrier recovery has been made;
   an interpolator configured to interpolate the baseband real signal and the baseband imaginary signal using a recovered symbol clock;
   a match filter configured to filter a signal interpolated by the interpolator;
   a symbol clock recovery configured to detect symbol timing information from a signal filtered by the match filter, and to recover a symbol clock using the detected symbol timing information;
   a channel equalizer configured to remove an interference between symbols using a signal filtered by the match filter;
   a carrier recovery configured to detect a pilot signal from a signal outputted from the channel equalizer, and to recover a carrier signal using the detected pilot signal; and
   a FEC configured to demodulate a signal outputted from the channel equalizer.

3. The digital broadcasting receiver of claim 1, wherein the lock detector comprises:
   an AGC (auto gain control) lock detector configured to output the AGC LOCK signal to the lock processor if the digital demodulator performs the gain control step;
   a symbol clock lock detector configured to output the TR LOCK signal to the lock processor if the digital demodulator performs the timing recovery step;
   a carrier signal lock detector configured to output the CR LOCK signal to the lock processor if the digital demodulator performs the carrier signal recovery step; and
   a FEC lock detector configured to output the FEC LOCK signal to the lock processor if the digital demodulator performs the error correction step.

4. The digital broadcasting receiver of claim 3, further comprising:
   an input signal detector configured to output the NO SIGNAL signal to the lock processor by judging whether the input signal is present, provided with level information of the input signal from a gain recovery of the digital demodulator; and a SNR calculator configured to output the SNR LOCK signal to the lock processor according to a SNR of a signal received through a carrier recovery of the digital demodulator.

5. A digital broadcasting receiver comprising:

a digital demodulator having a gain recovery, a symbol clock recovery, a channel equalizer, a carrier recovery, and a FEC (Forward Error Correction), configured to demodulate a digital broadcasting signal;

an input signal detector configured to output a NO SIGNAL signal by judging whether an input signal is present, provided with level information of the input signal from the gain recovery;

an AGC lock detector configured to output an AGC LOCK signal if the gain recovery performs a gain control;

a symbol clock lock detector configured to output a TR LOCK signal if the symbol clock recovery performs a timing recovery;

an SNR calculator configured to output a SNR LOCK signal according to an SNR of a signal received through the carrier recovery;

a carrier signal lock detector configured to output a CR LOCK signal if the carrier recovery performs a carrier signal recovery;

an FEC lock detector configured to output a FEC LOCK signal if the FEC performs an error correction; and a lock processor configured to control the gain recovery, the symbol clock recovery, the channel equalizer, the carrier recovery, and the FEC according to the lock signals, wherein the lock processor is further configured to examine each of the plurality of lock signals and output information to correct a problem causing a corresponding lock signal not be detected by the lock detector, and wherein the lock processor comprises:

a timer configured to count a time starting from a time point at which the receiver is enabled;

a memory having respective storage spaces assigned for the lock signals; and a storage controller configured to receive the lock signals from the lock detector and to control the demodulating operational step of the digital demodulator using a final lock time of the received lock signals and time information corresponding to the time counted by the timer.

6. The digital broadcasting receiver of claim 5, wherein the lock processor is further configured to control the symbol clock recovery to operate if the lock signal is received from the input signal detector, to control the channel equalizer and the carrier recovery to operate if the lock signal is received from the AGC lock detector or the symbol clock lock detector, and to control the FEC to operate if the lock signal is received from the SNR calculator or the carrier signal lock detector.

7. A method for driving a digital broadcasting receiver having a gain recovery, a symbol clock recovery, a channel equalizer, a carrier recovery, a FEC (Forward Error Correction), and a lock signal detector for outputting a lock signal according to operations of the above elements, the method comprising:

receiving a reset signal;

driving the gain recovery and judging whether an input signal is present according to a first lock signal received from the lock signal detector;

if the input signal is present, driving the symbol clock recovery and judging whether the symbol clock recovery has performed a timing recovery according to a second lock signal received from the lock signal detector;

if the symbol clock recovery performs the timing recovery, driving the channel equalizer and the carrier recovery and judging whether the channel equalizer and the carrier recovery have performed a carrier recovery according to a third lock signal received from the lock signal detector;

if the channel equalizer and the carrier recovery perform the carrier signal recovery, driving the FEC and judging whether the FEC has performed an error correction according to a fourth lock signal received from the lock signal detector;

if the FEC performs an error correction, storing information regarding the lock signals received from the lock signal detector; and counting a time starting from a time point at which the receiver is enabled;

storing the lock signals in a memory having respective storage spaces assigned for the lock signals; and receiving one of the first lock signal, the second lock signal, the third lock signal and the fourth lock signal, and controlling one of the driving steps using a final lock time of the received lock signal and time information corresponding to the counted respective times, wherein the lock processor examines each of the first, second, third and fourth lock signals and outputs information to correct a problem causing a corresponding lock signal not be detected by the lock detector.

8. The method of claim 7, wherein the step of judging whether the input signal is present comprises:

if the input signal is not present, repeatedly performing the step of driving the gain recovery.

9. The method of claim 7, wherein the step of judging whether the symbol clock recovery has performed the timing recovery comprises:

if the symbol clock recovery has not performed the timing recovery, repeatedly performing the step of driving the symbol clock recovery.

10. The method of claim 7, wherein the step of judging whether the channel equalizer and the carrier recovery have performed a carrier recovery, comprises:

if the channel equalizer and the carrier recovery have not performed a carrier recovery, repeatedly performing the step of driving the channel equalizer and the carrier recovery.

11. The method of claim 7, wherein the step of judging whether the FEC has performed the error correction comprises:

if the channel equalizer and the carrier recovery have not performed the carrier signal recovery, repeatedly performing the step of driving the FEC.

* * * * *